UNITED STATES PATENT OFFICE.

THOMAS B. OSBORNE, OF NEW HAVEN, CONNECTICUT.

COMPOSITION TO BE USED AS A VARNISH, LACQUER, OR GLUE.

SPECIFICATION forming part of Letters Patent No. 456,772, dated July 28, 1891.

Application filed April 23, 1891. Serial No. 390,147. (Specimens.)

*To all whom it may concern:*

Be it known that I, THOMAS B. OSBORNE, a citizen of the United States, residing at New Haven, in the county of New Haven and State of Connecticut, have invented a new and useful Composition of Matter to be Used as a Varnish, Lacquer, or Glue, of which the following is a specification.

The principal ingredient of my new composition is zein, an albuminoid substance found in Indian corn, which has many of the physical properties of pyroxiline.

My new composition of matter consists of a mixture of zein, resinous gum, and a mutual solvent thereof, and is tough, water-proof, transparent, dries with a hard brilliant surface, and adheres tenaciously to glass, wood, metals, and other surfaces.

Under the words "resinous gum" I include amber, copal, shellac, common rosin, and like substances, soluble in alcohol, or some other solvent of zein.

It is difficult to state any exact proportions which must be employed in order to produce the characteristic result of a homogeneous mixture of zein and resinous gum; but I have found that the best results are attained by using from twenty-five to fifty parts of resinous gum to fifty parts of zein. The proportion of solvent will vary with the use to which the composition is to be applied. For instance, when used as a lacquer for protecting metal surfaces, the solution should be much thinner than when it is used as a glue or cement. A suitable solution for varnishing wood consists of two pounds of zein, two pounds of rosin, and alcohol enough to make up a gallon of varnish.

What I claim, and desire to secure by Letters Patent, is—

The herein-described composition of matter, consisting of zein, a resinous gum, and a mutual solvent thereof, substantially in the proportions herein specified.

THOMAS B. OSBORNE.

Witnesses:
   JOHN K. BEACH,
   FRANCIS G. BEACH.